United States Patent [19]

Wessel

[11] Patent Number: 4,656,439
[45] Date of Patent: Apr. 7, 1987

[54] SYSTEM FOR NANOSECOND MODULATION OF AN INFRARED LASER BEAM BY COHERENT STARK SWITCHING

[76] Inventor: John E. Wessel, 544 First St., Manhattan Beach, Calif. 90266

[21] Appl. No.: 531,319

[22] Filed: Sep. 12, 1983

[51] Int. Cl.[4] .............................................. H01S 3/00
[52] U.S. Cl. .................................... 332/7.51; 455/611
[58] Field of Search ........................ 332/7.51; 330/4.3; 455/611

[56] References Cited

U.S. PATENT DOCUMENTS 3,806,834  4/1974  Johnson et al. ................... 332/7.51
3,842,372  10/1974 Pao et al. ........................... 332/7.51
4,085,387  4/1978  Asawa et al. ...................... 331/94.5

OTHER PUBLICATIONS

John Wessel, *Applied Physics Letters*, "Nanosecond Modulation at 10 $\mu$m by Coherent Stark Switching", Sep. 1, 1982, pp. 411–413.

*Primary Examiner*—S. C. Buczinski
*Assistant Examiner*—Linda J. Wallace

[57] ABSTRACT

Disclosed is a system for coherent transient Stark switching for low power modulation of an infrared laser beam at a gigahertz rate and a nanosecond risetime. When a molecular frequency of a gas that has been excited by an electric field is shifted out of resonance relative to a laser beam by a coherent Stark pulse, the shifted excited molecular frequency will heterodyne with the laser frequency to give a beat signal having improved modulation depth and increased speed for use in space satellite communication.

8 Claims, 3 Drawing Figures

SYSTEM FOR NANOSECOND MODULATION OF AN INFRARED LASER BEAM BY COHERENT STARK SWITCHING

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

This invention relates to modulation of lasers for use in communications and in particular the use of coherent stark effects to achieve modulation of a laser beam.

2. Prior Art

It has been known that space applications of laser communications will ultimately depend on development of systems with low power consumption and gigahertz modulation bandwidths. The $CO_2$ laser is an ideal source in terms of efficiency and power output, however, conventional 10 $\mu$m electro-optic modulators require excessive drive voltage and power. In the past it has been demonstrated that the incoherent molecular Stark effect can provide efficient low voltage pulse modulation at several discrete $CO_2$ laser wavelengths. Conventional incoherent Stark modulation has a bandwidth limitation imposed by the Doppler width (delta nu that is approximately 80 MHz at 10 $\mu$m. Therefore there is trade-off of modulation depth for response speed at modulation rates above this frequency.

Coherent Stark switching in the Infrared (IR) has been conducted in the area of 0.1–100 $\mu$s time for precise stucy of slow collision processes.

SUMMARY OF THE INVENTION

Accordingly, it is an important object of the invention to provide an improved means of coherent stark switching, that approaches a gigahertz rate, of an infrared laser beam.

It is another object of the invention to provide a $CO_2$ laser as the source of the infrared laser beam.

Another object of the invention is to provide a stark cell as the medium for the coherent stark switching of the infrared laser beam.

Yet another object of the invention is to provide a stark pulse as the means for causing the coherent stark switching in the stark cell of the laser beam.

Yet but another object of the invention is to provide a gas in the stark cell whose molecular frequency can be made to be resonant with the frequency of the infrared laser beam when excited by an electric field.

A further object of the invention is to provide that the stark pulse change the excited molecular frequency to be out of resonance.

A yet further object of the invention is to provide that the out of resonance excited molecular frequency heterodyne with the laser frequency to create a beat frequency for use in satellite communication.

DETAILED DESCRIPTION OF THE INVENTION

Figure 1:
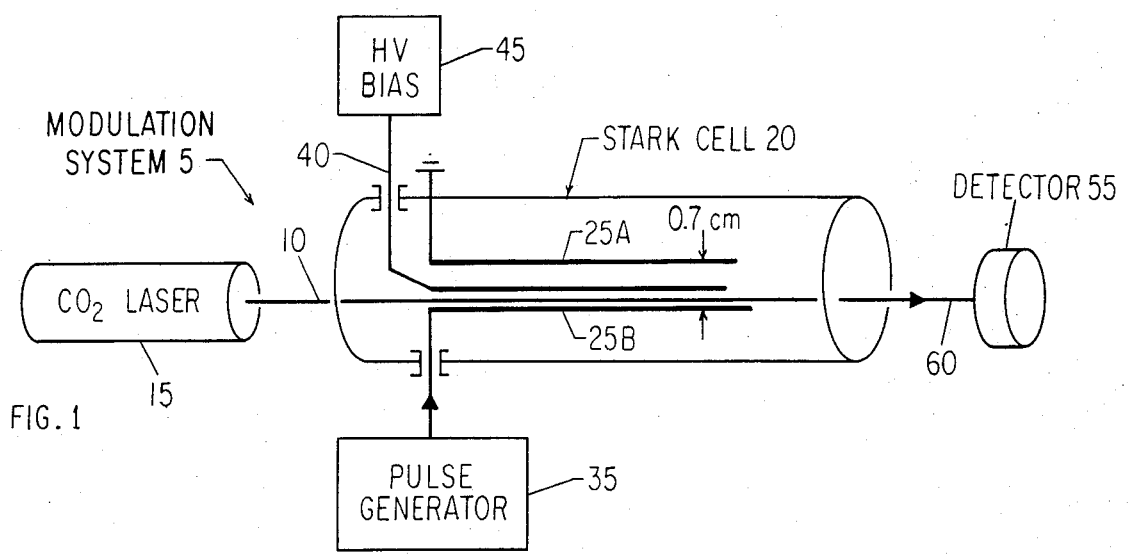
FIG. 1 is a schematic diagram of the system for stark switching.

In the preferred embodiment of the invention as shown in FIG. 1, a system 5 for modulating an infrared laser beam through the use of coherent stark switching is employed. The structure of the system 5 includes unfocused output or beam 10 from a longitudinally excited $^{13}CO_2$ laser 15. The laser has a relatively high intensity 5 watt power output and is tuned to the 10.78 um R (18) infrared line. The infrared output 10 of the laser is operative to beam through a stark cell 20 having a relatively low gas pressure and having stripline or lines or outer electrodes 25A & 25B of 50 ohm impedance with a length of 10 cm and a separation of 0.7 cm there between. A coherent stark pulse of relatively rectangular shape is derived from a pulse generator or pulser 35 having a 250 ps risetime and pulse duration controlled by charge line length through outter electrode 25 B to be co-propagated with the laser beam 10. An additional DC bias electrode or line 40, from a high voltage (HV) bias source 45 having a length of 7 cm is interposed between the outer electrodes 25A & 25B with a 0.07 cm separation 50 from the outer electrode or signal line 25B. The function of the DC bias electrode 40 is to apply a high field strength in the region of the laser beam 10. The infrared or laser beam signal 10 is transmitted through the cell 20 where it may be modulated by the electrode 25B for outputting as signal 60 to be received by a copper-germanium (Cu:Ge) detector 55 with a risetime of 1.5 ns.

In regards to the theory of operation of the preferred embodiment of the modulation system 5, the time scale of concern is generally in the nanosecond (ns) range and more specifically in the 2 ns range. It will be further appreciated that the rise time of the pulse on electrode 25B, $T_R$ exceeds the inverse of delta NU (Doppler) times pi, or Doppler period. In free induction decay (FID) as used in the preferred embodiment to effect modulation, a resonant Doppler subset of the gas used in cell 20, the isotope gas or (ammonia) vapor $^{14}NH_3$ in the preferred embodiment, is initially pumped or driven by the beam 10 from the laser 15. The electric field of the stark pulse on electrode 25B is then used to shift or change transitions in the molecular frequency of the gas in the cell 20 away from resonance thereby leaving a residual oscillating off-diagonal polarization at the stark shifted frequency of the gas. This polarization generates an electric field that hetrodynes with the electric field of the laser beam 10 to produce a beat frequency at the stark shifted frequency of the gas in the cell 20.

It will be also noted that molecules of the gas in the cell 20 that are shifted in the opposite sense, from that noted supra, from out-of-resonance into resonance undergo an optical nutation process thereby allowing the population of gas molecules in the cell 20 to successively and attenuatively cycle between ground and excited states. The result of the optional nutation is an oscillation at the Rabi frequency ($W_R = u_{AB} Eo/h$, where $u_{AB}$ is the transition dipole and Eo is the optical field strength) between strong unsaturated absorption and superradiant emission.

The transition of the isotope gas or ammonia vapor, $^{14}NH_3$, ($V_2$, J, K) ($1_s$, 5, 4) that is the result of ($O_a$, 5, 4), was selected in the preferred embodiment insomuch as it has sufficient strength to be detected at gas pressures below 1 Torr as used in the cell 20, and operative to be acted on by a D C bias electrode 40 having a length of 7 cm.

The stark tuning curve, consisting of the laser beam, sensed by detector 55, as a function of the changing D C bias on electrode 40, for a cell 20 pressure of 0.2 Torr, has a maximum attentuation at 60%. This has been demonstrated using the R (18) line of the $^{13}CO_2$ laser 15 operating at a relatively low intensity of approximately one watt per centimeter squared. Full width at half-maximum attenuation under these conditions is 40 volts. Therefore a 50 volt stark pulse applied through electrode 25 B to the cell 20 biased at 435 volts on electrode 40, acts to shift the entire Doppler contour, of the gas in the cell 20, out of resonance.

Figure 2:
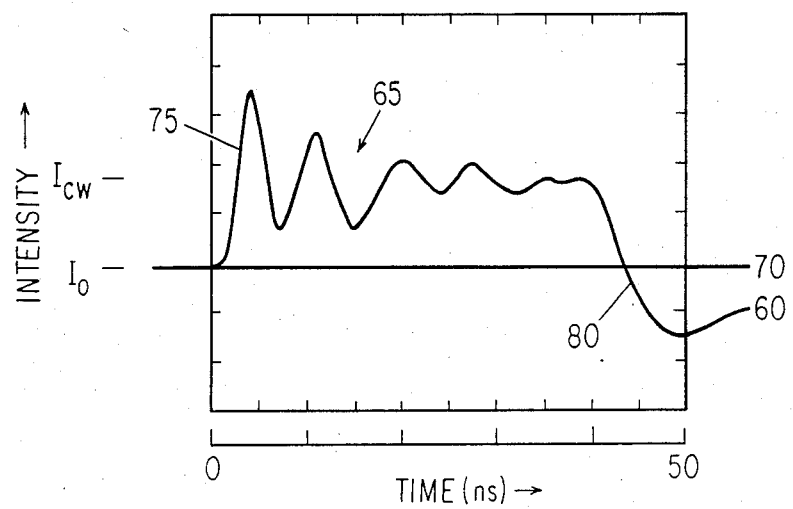
FIG. 2 is the detected output from the system of FIG. 1 at 0.25 Torr pressure for a 40 ns rectangular 50 v stark pulse.

In regard to the actual general operation of the preferred embodiment of the modulation system 5, FIG. 2 shows the heterodyne beat FID signal 65 of the output signal 60. This was obtained using full intensity (approx. 10 W/cm$^2$) of the laser 15 and a 50 V rectangular Stark pulse of 57 ns duration on electrode 25B as applied to a 0.2 Torr 14NH$_3$ gas pressure in cell 20 that is biased at 435 V by electrode 40. The pulse on line 25B reduces the effective field strength induced by electrode 40 and shifts transitions of the gas in cell 20 out-of-resonance. Prior to arrival of the pulse on line 25B, the signal level of the laser beam 10 is determined by the steady state saturated absorption of the gas appropriate to the initial bias field induced by line 40. A damped oscillatory FID signal 65 will appear at the left 75 of FIG. 2 in a position corresponding to arrival of the electric field pulse on line 25B. The beat frequency is 113 (+8) MHz, which is the Stark shift which may be calculated independently from the Stark tuning coefficient. The initial signal deflection or FID signal 75 corresponds to increasing intensity received by the detector 55.

The risetime of oscillation for the FID signal 65 at 75 is less than the 2 ns response time of the detector 55 for all input pulse voltages used (5–50 V) on line 25B. Coherent emission is clearly evident in that the peak signal level or FID signal 65 exceeds the level corresponding to unattenuated transmission or where there is no laser beam 10 as when at 70. The initial FID signal 65 deflection at 75 is 1.7 times as large as the signal increase associated with decrease in steady state absorption. the FID signal 65 damping time is strongly dependent on collisional dephasing gas pressure of cell 20 and the oscillation frequency increases in direct proportion to increasing pulse amplitude.

Following termination of the Stark pulse on line 25B the nutation signal 80 is observed. The laser beam 10 is greatly attenuated by unsaturated absorption of ground state gas molecules in cell 20. Population of the gas in the cell 20 oscillates between lower and upper states until dephasing processes returned it to saturation. Nutation oscillations do not appear in FIG. 2 because the intensity profile of the beam 15 of the laser 10 is non-uniform. Nutation amplitude and decay time are sensitive to intensity and pressure from the laser beam 15.

As the dc bias voltage on line 40 is tuned away from resonance, the FID 65 and nutation signal levels 80 are modulated by the Doppler line profile of the gas in cell 20. When the dc bias on line 40 is adjusted so that the Doppler profile is out of resonance with the laser 15 and the pulsed field on line 25B is adjusted to produce resonance, response will start with a strong nutation signal 80 and be terminated with FID 65. Intermediate combinations of dc bias on line 40 and pulse voltages on line 25B will provide mixed response characteristics. The largest amplitude FID signal 65 may be found in the presence of a strong nutation 80. Optimum use has been made of the large undamped polarization that exists prior to onset of dephasing processes of the gas in cell 20.

In particular, as to the operation in regards to FIG. 2, the output signal 60 received by detector 55 has been demonstrated at 0.25 Torr gas pressure for cell 20 for a 40 ns rectangular 50 V electrical pulse on line 25 that is operative to shift the $^{14}NH_3$ transition out-of-resonance with the laser beam 15. The FID signal 65 starts at 75 with a rapid increase of intensity and oscillates at a 103 MHz Frequency. After 4 cycles it decays to a steady state value $I_{cw}$ corresponding to no absorption. The electrical pulse ends after 57 ns and a strong decrease in intensity (below the value for saturated resonance absorption, denoted $I_o$) is observed (nutation).

Figure 3:
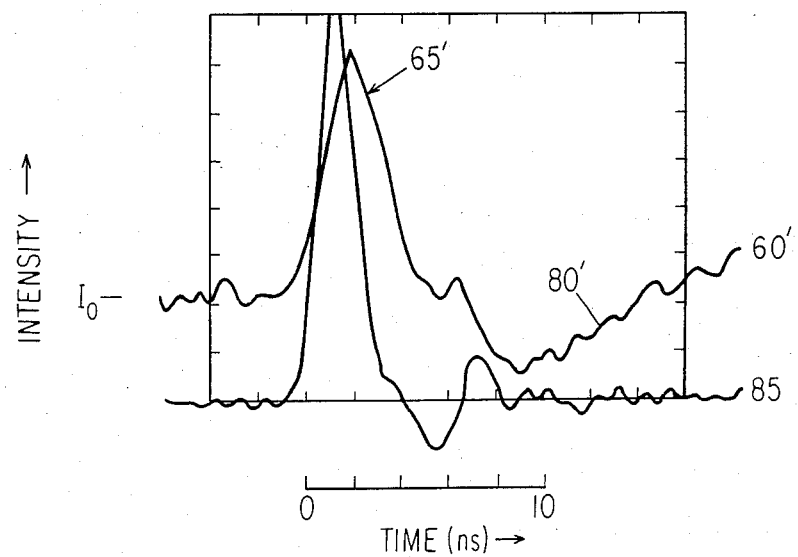
FIG. 3 is the detected output from the system of FIG. 1 at 0.75 Torr pressure for a 2 ns rectangular 40 v. stark pulse.

In general, as to the operation for a 2 ns pulse on line 25B as shown in FIG. 3, at 85, nutation amplitude 80' will decrease about 50 percent and the on-half cycle FID signal 65' of the output signal 60' will be unattenuated relative to longer duration Stark pulses. In this case the FID signal 65' risetime will be less than 2 ns and the observed FID signal 65' pulse width will be 4 ns.

In particular as to the operation as shown in FIG. 3, detector output 65' as given for a 0.75 Torr gas cell 20 pressure for a 2 ns rectangular 40 V electrical pulse on line 25B as shown at 85 is operative to shift the NH$_3$ transition, for the gas in cell 20, out-of-resonance with the laser beam 15.

In conclusion, the present invention demonstrates large amplitude coherent response on time scales less than the inverse of delta nu (Doppler). The FID signal 65 & 65' has a rapid risetime and is therefore of principal interest for fast modulation. The FID signal 65 & 65' will terminate abruptly at the end of the electrical pulse on line 25B. A nutation component 80 & 80' will develop with risetime limited by the inverse of delta nu (Doppler) and the Rabi frequency. Although nutation 80 & 80' is present following short duration pulses on line 25B, the amplitude becomes negligible when pulse duration on line 25 B is less than the Rabi cycle time and less than $T_1$, the population recovery time. It will be appreciated that the above embodiment includes subnanosecond pulse modulation.

While the above referenced embodiments of the invention have been described in considerable detail, it will be appreciated that other modifications and variations therein may be made by those skilled in the art without departing from the true spirit and scope of the invention.

What is claimed is:

1. A modulation system for space satellite communication, comprising:
   (a) first means for outputting at a predetermined level a bias signal having an electric field;
   (b) second means for outputting at a predetermined frequency a coherent infrared beam having an electric field;
   (c) Stark cell means having a gas with a predetermined molecular frequency, and operative to receive the electric field of the bias signal from said first outputting means for exciting the molecular frequency of the gas to be in resonance with the frequency of the coherent infrared beam from said second outputting means;

(d) third means for outputting an electrical pulse to said Stark cell means for shifting the excited molecular frequency of the gas molecules of said Stark cell means coherently, to be out of resonance with the laser beam, in order to generate an electric field for heterodyne beating with the electric field of the coherent infrared beam from said second outputting means; and (e) a detection means with a response speed adequate to resolve the modulated infrared beam.

2. The modulation system according to claim 1 wherein the second outputting means has a relatively high intensity at a predetermined level.

3. The modulation system according to claim 1 wherein the second outputting means is a $CO_2$ laser.

4. The modulation system according to claim 1 wherein the coherent Stark pulse outputted by said third means is relatively rectangularly shaped at a predetermined level.

5. The modulation system according to claim 1 wherein the gas of the Stark cell means has a relatively low pressure at a predetermined level.

6. The modulation system according to claim 1 wherein the gas of the Stark cell means is an ammonia vapor.

7. The modulation system according to claim 1 wherein the gas of Stark cell means is $^{14}NH_3$.

8. The modulation system according to claim 1 wherein the detection means can resolve the modulated infrared beam if such modulated infrared beam has rise time less than 2 nanoseconds.

* * * * *